United States Patent
Chen

(10) Patent No.: US 10,592,426 B2
(45) Date of Patent: Mar. 17, 2020

(54) PHYSICAL REGION PAGE ADDRESS CONVERTER AND PHYSICAL REGION PAGE LIST ACCESS METHOD

(71) Applicant: ASMedia Technology Inc., New Taipei (TW)

(72) Inventor: Wen-Cheng Chen, New Taipei (TW)

(73) Assignee: ASMEDIA TECHNOLOGY INC., New Taipei (TW)

(*) Notice: Subject to any disclaimer, the term of this patent is extended or adjusted under 35 U.S.C. 154(b) by 0 days.

(21) Appl. No.: 16/038,203

(22) Filed: Jul. 18, 2018

(65) Prior Publication Data

US 2019/0227943 A1    Jul. 25, 2019

(30) Foreign Application Priority Data

Jan. 23, 2018 (TW) .............................. 107102395 A

(51) Int. Cl.
*G06F 12/1009* (2016.01)
*G06F 12/06* (2006.01)

(52) U.S. Cl.
CPC ...... *G06F 12/1009* (2013.01); *G06F 12/0676* (2013.01); *G06F 2212/1044* (2013.01)

(58) Field of Classification Search
CPC ............. G06F 2212/1044; G06F 12/10; G06F 12/1009

USPC ......................................................... 711/202
See application file for complete search history.

(56) References Cited

U.S. PATENT DOCUMENTS

| 2018/0052634 A1* | 2/2018 | Ngu ...................... G06F 3/0611 |
| 2018/0260347 A1* | 9/2018 | Benisty .................. G06F 13/28 |
| 2019/0171566 A1* | 6/2019 | Jung ................... G06F 12/0804 |

FOREIGN PATENT DOCUMENTS

| CN | 1737759 A | 2/2006 |
| CN | 1790248 A | 6/2006 |

* cited by examiner

*Primary Examiner* — Hashem Farrokh
(74) *Attorney, Agent, or Firm* — CKC & Partners Co., LLC

(57) ABSTRACT

A method for accessing a physical region page (PRP) list includes obtaining a PRP address of a PRP list, in which the PRP address has M bits; performing operation to the first N bits of the PRP address and the N+1 th to Mth bits of the PRP address respectively to obtain a page base address if the PRP address is within a page boundary; and performing operation to the first N bits of the PRP address and the N+1 th to Mth bits of the PRP address respectively to obtain next PRP address pointer if the PRP address reaches the page boundary. N is an integer, and M is an integer larger than N.

10 Claims, 4 Drawing Sheets

PHYSICAL REGION PAGE ADDRESS CONVERTER AND PHYSICAL REGION PAGE LIST ACCESS METHOD

RELATED APPLICATIONS

This application claims priority to Taiwan Application Serial Number 107102395, filed Jan. 23, 2018, which is herein incorporated by reference.

BACKGROUND

Technical Field

The present disclosure relates to a physical region page (PRP) list, and in particular, to a method for accessing the physical region page (PRP) list.

Description of Related Art

In a system based on Non-Volatile Memory Express (NVME), PRP list are widely applied to access data.

However, traditionally, the PRP list is stored in the physical memory. When the amount of the PRP lists increases, the memory required increases. In a system with limited memory space, an important area of research in the field involves ways in which to reduce the memory space used by the PRP list.

SUMMARY

One aspect of the present disclosure is a method for accessing a physical region page list. The method for accessing the physical region page list includes obtaining a physical region page address of a physical region page list, in which the physical region page address includes M bits; performing operation to first N bits of the physical region page address and N+1 th to Mth bits of the physical region page address respectively, to obtain a page base address if the physical region page address is within a page boundary; and performing operation to the first N bits of the physical region page address and the N+1 th to the Mth bits of the physical region page address respectively to obtain next physical region page address pointer if the physical region page address reaches the page boundary, in which N is an integer, and M is an integer larger than N.

Another aspect of the present disclosure is a physical region page address converter. The physical region page address converter includes a first operating circuit, a second operating circuit, an adder circuit, a subtractor circuit and a multiplexer. The first operating circuit is configured to divide first N bits of a physical region page address by a predetermine value, and multiply by a page size parameter to calculate a first value. The second operating circuit is configured to multiply N+1 th to Mth bits of the physical region page address by the page size parameter to calculate a second value. The adder circuit is configured to add the first value and the second value to calculate a third value. The subtractor circuit is configured to subtract the third value by an offset value to calculate a fourth value. The multiplexer is configured to receive the third value and the fourth value, and selectively output the third value as next physical region page address pointer, or output the fourth value as a page base address to a memory controller based on whether the physical region page address reaches a page boundary.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
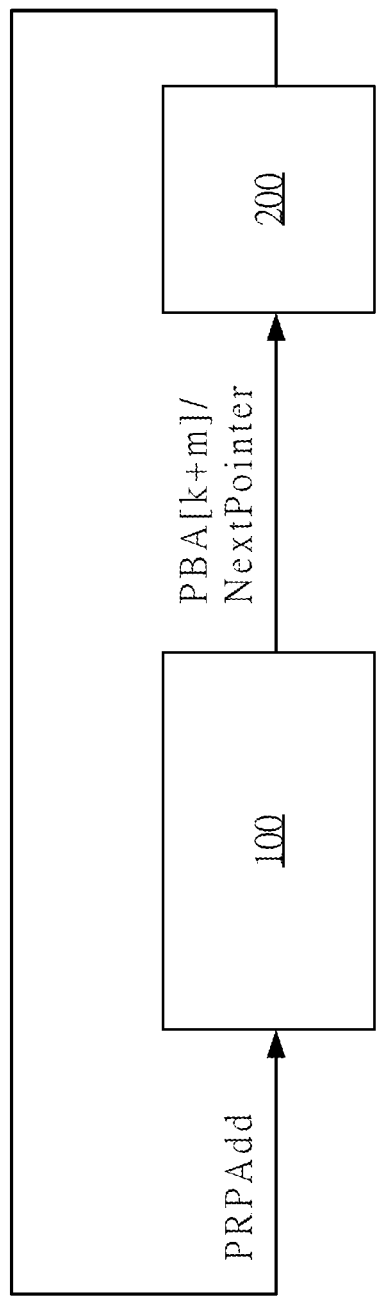
FIG. 1 is a diagram illustrating a physical region page address (PRP address) converter according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a physical region page address (PRP address) converter 100 according to some embodiments of the present disclosure. As shown in FIG. 1, in some embodiments, the PRP address converter 100 is configured to receive a PRP address PRPAdd of a physical region page list (PRP list), and convert to a page base address PBA[k+m] and a next physical region page address pointer NextPointer, in which the next physical region page address pointer points to the address of the next PRP list located. The page base address PBA[k+m] indicates it corresponds to the (m+1)th page of kth page list, in which k is an integer and m is zero or an integer.

Thus, when the memory controller 200, such as a memory controller 200 based on Non-Volatile Memory Express (NVME), reads the PRP address PRPAdd, the PRP address controller 100 may return and transmit the page base address PBA[k+m] and the next physical region page address pointer NextPointer to the memory controller 200 to read the data.

Figure 2:
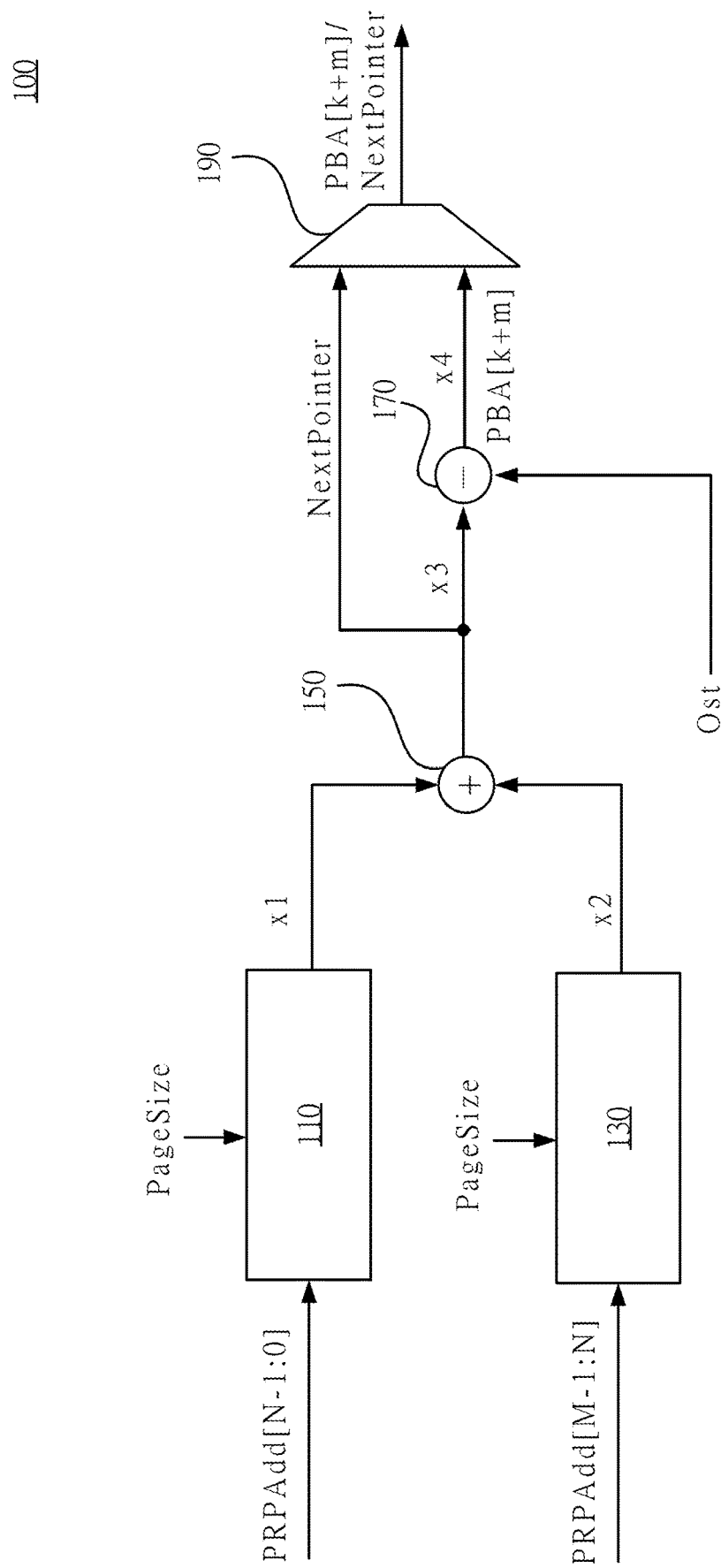
FIG. 2 is a diagram illustrating the RPP address converter according to some embodiments of the present disclosure.

For the convenience of explanation, reference is made to FIG. 2. FIG. 2 is a diagram illustrating the RPP address converter 100 according to some embodiments of the present disclosure.

As shown in FIG. 2, in some embodiments, the PRP address converter 100 includes an operating circuit 110, an operating circuit 130, an adder circuit 150, a subtractor circuit 170, and a multiplexer 190. As shown in FIG. 2, the adder circuit 150 is coupled to the operating circuit 110 and the operating circuit 130. The subtractor circuit 170 is coupled to the adder circuit 150. The multiplexer 190 is coupled to the adder circuit 150 and the subtractor circuit 170. In the following paragraphs, the operations of each function circuits will be discussed in details in accompanying with the embodiments.

As shown in FIG. 2, in some embodiments, the operating circuit 110 is configured to divide first N bits PRPAdd[N−1:0] of the physical region page address PRPAdd by a predetermine value (e.g., 8), and multiply by a page size parameter PageSize to calculate a first value x1. Specifically, the page size parameter PageSize may be any power of 2. For example, in some embodiments, the page size parameter PageSize may be 4K (i.e., 2 to the 12th power), but the present disclosure is not limited thereto. N may be any integer.

For example, when the PRP address PRPAdd of the current PRP list is 0xE0200000, N is 12, and the page size parameter PageSize is 4K, the operating circuit 110 is configured to divide first 12 bits (i.e., the last three digits in hexadecimal) of 0xE0200000 by 8 (i.e., right shift by 3 bits), and multiply by 4K (i.e., left shift by 12 bits) to calculate the first value x1 as 0x00000000.

In some embodiments, the operating circuit 130 is configured to multiply the (N+1)th to the Mth bits PRPAdd[M−1:N] of the physical region page address PRPAdd by the page size parameter PageSize to calculate a second value x2, in which M is the total number of bits in the PRP address PRPAdd.

Following by the example above, when the PRP address PRPAdd of the current PRP list is 0xE0200000, N is 12, and the page size parameter PageSize is 4K, the operating circuit 130 is configured to multiply the 13th bit to the 64th bit by 4K (i.e., filling 0 in the first 12 bits) to calculate the second value x2 as 0xE0200000.

In some embodiments, the adder circuit 150 is configured to add the first value x1 and the second value x2 to calculate a third value x3. Following by the example above, the third value x3 is 0xE0200000.

In some embodiments, the subtractor circuit 170 is configured to subtract the third value x3 by an offset value Ost to calculate a fourth value x4. Following by the example above, on the condition that the offset value Ost is 0xE0000000, the fourth value x4 is 0x00200000.

In some embodiments, the multiplexer 190 is configured to receive the third value x3 and the fourth value x4, and selectively output the third value x3 as the next physical region page address pointer NextPointer, or output the fourth value x4 as the page base address PBA[k+m] to the memory controller 200 based on whether the physical region page address PRPAdd reaches a page boundary.

Following by the example above, since the physical region page address PRPAdd is within the page boundary, the multiplexer 190 returns the fourth value x4 (i.e., 0x00200000) as the page base address PBA[k+0].

It is noted that, when configuring the PRP address pointer, the physical region page address pointer is configured to be a first page the physical region page list pointing to, adding the offset value Ost. Thus, the PRP address converter 100 may be used for addressing to the actual page base address PBA[k+m] according to the PRP list, and returning the address to the memory controller 200. In addition, in some embodiments, when configuring the offset value Ost, the offset value Ost is greater than a data length to access, in order to avoid the PRP address converter 100 being unable to convert the PRP address PRPAdd properly to obtain the page base address PBA[k+m] and the next PRP address pointer NextPointer.

Following by the example above, when the memory controller 200 continues to read the next PRP address PRPAdd2, for example, 0xE0200008, the operating circuit 110 is configured to right shift the first 12 bits of 0xE0200008 by 3 bits, and left shift by 12 bits to obtain the first value x1 as 0x00001000.

Similarly, the operating circuit 130 calculates the second value x2 as 0xE0200000. The adder circuit 150 adds the first value x1 and the second value x2 to obtain the third value x3 as 0xE0201000. The subtractor circuit 170 subtracts the third value x3 by the offset value Ost to calculate the fourth value x4 as 0x00201000. At the meantime, the PRP address does not reach the page boundary, and thus the multiplexer 190 outputs and returns the fourth value x4 (i.e., 0x00201000) as the page base address PBA[k+1], and so on. Accordingly, PRP address converter 100 may output the page base address PBA[k+m] 0x00201000, . . . , 0x003FE000 in response to the PRP address 0xE0200010, . . . , 0xE0200FF0.

When the memory controller 200 continues to read the next PRP address PRPAdd, for example, 0xE0200FF8, the first value x1 is 0x001FF000, the second value x2 is 0xE0200000. Thus, the third value x3 and the fourth value x4 are 0xE03FF000 and 0x003FF000 respectively. Since the PRP address PRPAdd reaches the page boundary, the multiplexer 190 outputs and returns the third value x3 (i.e., 0xE03FF000) as the next physical region page address pointer NextPointer back to the memory controller 200. Accordingly, the memory controller 200 may find the next PRP list at the address 0xE03FF000.

Figure 3:
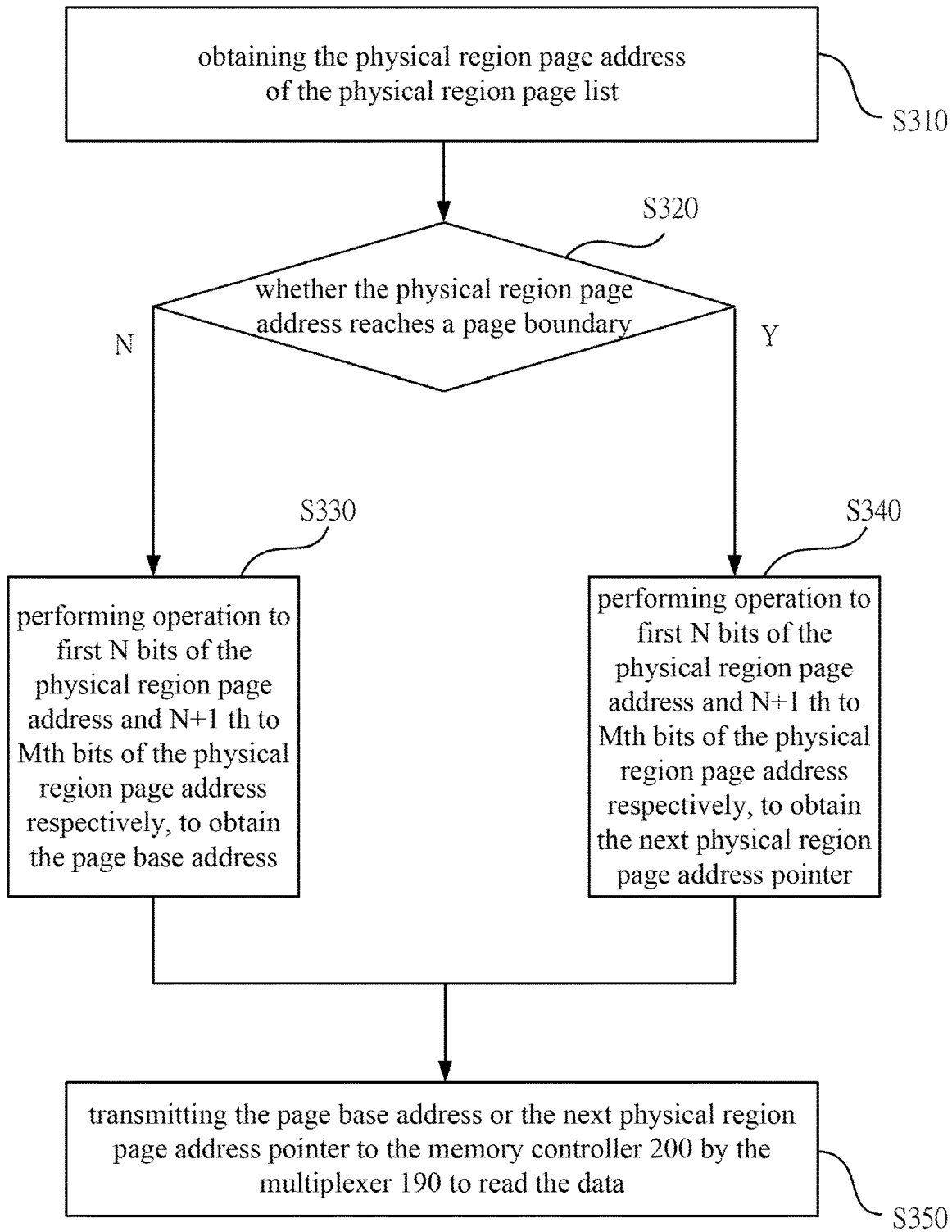
FIG. 3 is a flowchart diagram of a method for accessing the physical region page list according to some embodiments of the present disclosure.

Reference is made to FIG. 3. FIG. 3 is a flowchart diagram of a method 300 for accessing the physical region page list according to some embodiments of the present disclosure. For better understanding of the present disclosure, the method 300 is discussed in relation to the embodiments shown in FIG. 1 and FIG. 2, but is not limited thereto. It will be apparent to those skilled in the art that various modifications and variations can be made to the structure of the present disclosure without departing from the scope or spirit of the disclosure. As shown in FIG. 3, the method 300 for accessing the physical region page list includes steps S310, S320, S330, S340 and S350.

First, in the step S310, the PRP address converter 100 is configured to obtain the physical region page address PRPAdd of the physical region page list. Specifically, the physical region page address includes M bits.

Next, in the step S320, determining whether the physical region page address reaches a page boundary.

If the physical region page address is within the page boundary, step S330 is performed. In the step S330, the PRP address converter 100 is configured to perform operation to first N bits of the physical region page address PRPAdd and N+1 th to Mth bits of the physical region page address PRPAdd respectively, to obtain the page base address PBA [k+m].

On the other hand, if the physical region page address reaches the page boundary, S340 is performed. In the step S340, the PRP address converter 100 is configured to perform operation to first N bits of the physical region page address PRPAdd and N+1 th to Mth bits of the physical region page address PRPAdd respectively, to obtain the next physical region page address pointer NextPointer. In the above steps, N is an integer, and M is an integer larger than N.

Finally, in the step S350, the page base address PBA[k+m] or the next physical region page address pointer NextPointer is transmitted to the memory controller 200 by the multiplexer 190 to read the data.

Figure 4:
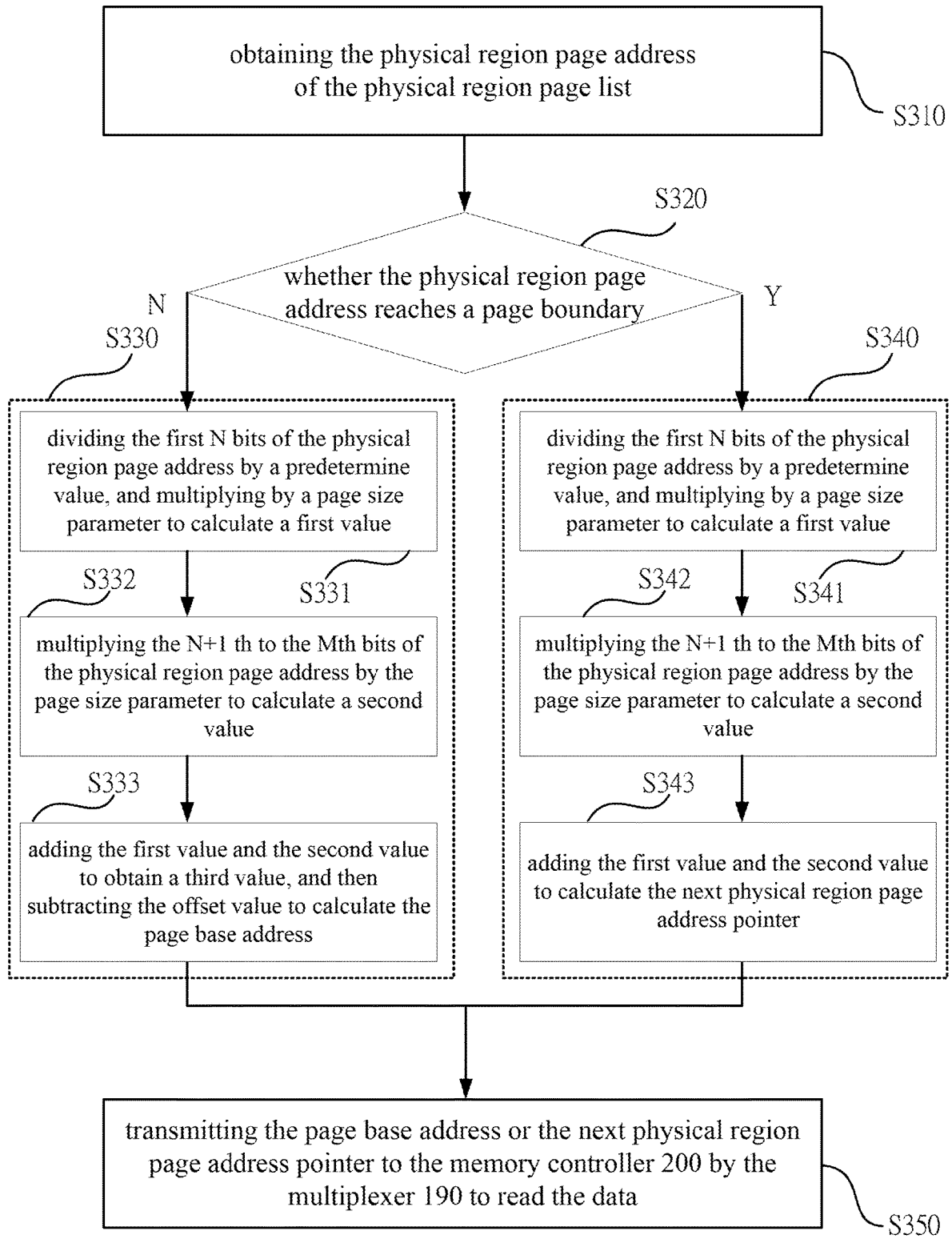
FIG. 4 is a detailed flowchart diagram illustrating the steps in the method for accessing the physical region page list according to some embodiments of the present disclosure.

Reference is made to FIG. 4 together. FIG. 4 is a detailed flowchart diagram illustrating the steps S330 and S340 in the method 300 for accessing the physical region page list according to some embodiments of the present disclosure. As shown in FIG. 4, specifically, operations of obtaining the page base address PBA[k+m] in the step S330 further includes steps S331, S332 and S333.

In the step S331, by the operating circuit 110, the first N bits of the physical region page address PRPAdd are divided by the predetermine value, and multiplied by the page size parameter PageSize to calculate the first value x1, in which the page size parameter PageSize is a power of 2.

In the step S332, by the operating circuit 130, the N+1 th to the Mth bits of the physical region page address PRPAdd are multiplied by the page size parameter PageSize to calculate the second value x2.

In the step S333, by the adder circuit 150 and the subtractor circuit 170, the first value x1 and the second value x2 are added to obtain the third value x3, and then subtracted by the offset value Ost to calculate the page base address PBA[k+m]. Specifically, the physical region page address PRPAdd is configured to be a first page the physical region page list pointing to adding the offset value Ost, and the offset value Ost is greater than the data length to access.

In addition, as shown in FIG. 4, specifically, operations of obtaining the next physical region page address pointer NextPointer in the step S340 further includes steps S341, S342 and S343.

In the step S341, by the operating circuit 110, the first N bits of the physical region page address PRPAdd are divided by the predetermine value, and multiplied by the page size parameter PageSize to calculate the first value x1.

In the step S342, by the operating circuit 130, the N+1 th to the Mth bits of the physical region page address PRPAdd are multiplied by the page size parameter PageSize to calculate the second value x2.

In the step S343, by the adder circuit 150, the first value x1 and the second value x2 are added to calculate the next physical region page address pointer NextPointer (i.e., the third value x3).

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In summary, in various embodiments of the present disclosure, by the co-operation of the units in PRP address converter 100, the method 300 for accessing the physical region page list may be achieved, and the PRP list is not required to store in the physical memory. Thus, the memory required will not increase due to the increase of the amount of the physical region pages, and the PRP list hardware structure may be realized with lower memory usage condition, and the processing speed of the data access may be improved.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for accessing a physical region page list, comprising:
    obtaining a physical region page address of a physical region page list, wherein the physical region page address comprises M bits;
    performing operation to first N bits of the physical region page address and N+1 th to Mth bits of the physical region page address respectively, to obtain a page base address if the physical region page address is within a page boundary; and
    performing operation to the first N bits of the physical region page address and the N+1 th to the Mth bits of the physical region page address respectively to obtain next physical region page address pointer if the physical region page address reaches the page boundary, wherein N is an integer, and M is an integer larger than N.

2. The method for accessing the physical region page list of claim 1, wherein the physical region page address is configured to be a first page the physical region page list pointing to adding an offset value.

3. The method for accessing the physical region page list of claim 2, wherein operations of obtaining the page base address comprises:
    dividing the first N bits of the physical region page address by a predetermine value, and multiplying by a page size parameter to calculate a first value;
    multiplying the N+1 th to the Mth bits of the physical region page address by the page size parameter to calculate a second value; and adding the first value and the second value, and subtracting the offset value to calculate the page base address.

4. The method for accessing the physical region page list of claim 3, wherein the page size parameter is a power of 2.

5. The method for accessing the physical region page list of claim 2, wherein the offset value is greater than a data length to access.

6. The method for accessing the physical region page list of claim 1, wherein operations of obtaining the next physical region page address pointer comprises:
   dividing the first N bits of the physical region page address by a predetermine value, and multiplying by a page size parameter to calculate a first value;
   multiplying the N+1 th to the Mth bits of the physical region page address by the page size parameter to calculate a second value; and
   adding the first value and the second value to calculate the next physical region page address pointer.

7. The method for accessing the physical region page list of claim 1, further comprising:
   transmitting the page base address or the next physical region page address pointer to a memory controller to read the data.

8. A physical region page address converter, comprising:
   a first operating circuit configured to divide first N bits of a physical region page address by a predetermine value, and multiply by a page size parameter to calculate a first value;
   a second operating circuit configured to multiply N+1 th to Mth bits of the physical region page address by the page size parameter to calculate a second value;
   an adder circuit configured to add the first value and the second value to calculate a third value;
   a subtractor circuit configured to subtract the third value by an offset value to calculate a fourth value; and
   a multiplexer configured to receive the third value and the fourth value, and selectively output the third value as next physical region page address pointer, or output the fourth value as a page base address to a memory controller based on whether the physical region page address reaches a page boundary.

9. The physical region page address converter of claim 8, wherein the page size parameter is a power of 2.

10. The physical region page address converter of claim 8, wherein the offset value is greater than a data length to access.

* * * * *